March 11, 1969  G. H. WILKEN ET AL  3,431,779
MONITORING DEVICE FOR INTERNAL COMBUSTION ENGINE
Filed Jan. 3, 1967  Sheet 1 of 2

INVENTORS
G. H. WILKEN
R. A. GINTER

INVENTORS
G. H. WILKEN
R. A. GINTER

United States Patent Office 3,431,779
Patented Mar. 11, 1969

3,431,779
MONITORING DEVICE FOR INTERNAL COMBUSTION ENGINE
George Henry Wilken, Dubuque, Iowa, and Robert Aloyious Ginter, Potosi, Wis., assignors to Deere & Company, Moline, Ill., a corporation of Delaware
Filed Jan. 3, 1967, Ser. No. 606,847
U.S. Cl. 73—291                     9 Claims
Int. Cl. G01f 23/10

ABSTRACT OF THE DISCLOSURE

An integrated internal combustion engine monitoring system utilizing a single electrically actuated indicator responsive to circuit resistance principally varied by a plurality of switches associated with different resistors and respectively actuated by changes in different engine conditions to visually indicate said engine conditions to a vehicle operator.

---

It is well-known to provide means for indicating to a vehicle operator various conditions of an internal combustion engine, such as engine temperature and oil pressure, the status of the fuel supply, and alternator or generator output. Both gauge-type indicators and malfunction-type indicators, which indicate only when the engine condition exceeds a predetermined value, are widely used. However, heretofore, separate indicators have generally been provided for the individual engine conditions being monitored, requiring the operator to direct his attention to separate areas during operation of the vehicle and complicating the vehicle instrument panel.

According to the present invention, a single indicator is provided for indicating various engine conditions to the operator to avoid the complexity and expense of multiple gauges and indicators and to provide a more simple and compact instrument panel.

A specific object of the invention is to provide such an engine monitoring system, which primarily indicates engine malfunctions, indicating the specific area of malfunction when a particular engine function exceeds a predetermined condition.

Another object is to provide such a system utilizing a single ohmmeter-type indicator responsive to the resistance in an electrical circuit, the resistance in turn being responsive to various engine conditions, and further to vary the circuit resistance by switching a plurality of resistances into or out of the circuit by means of switches actuated by different engine conditions.

Still another object is to provide such a system with a signal lamp or the like to direct the operator's attention to the indicator when certain engine malfunctions occur.

These and other objects will become apparent from the following detailed description and accompanying drawings wherein three different embodiments of the invention are illustrated.

Figure 1:
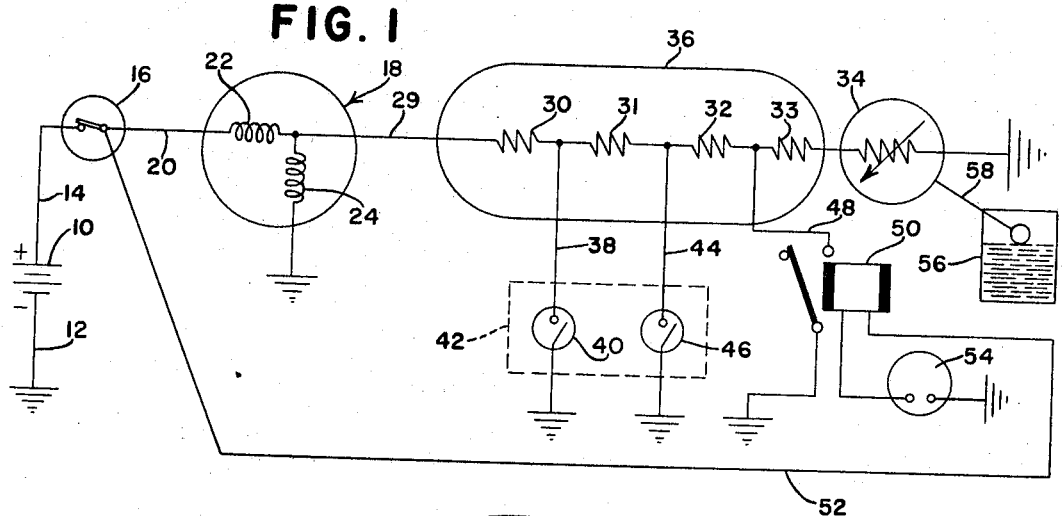
FIG. 1 is a schematic illustration of one embodiment of the engine monitoring system.
Figure 2:
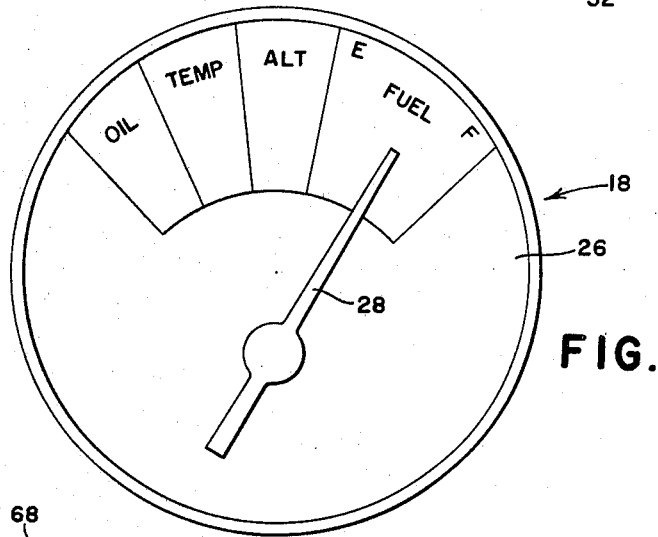
FIG. 2 is a view of the face of the indicator utilized in the system shown in FIG. 1.

In the first embodiment of the engine monitoring system, illustrated schematically in FIG. 1, there is shown a direct current power source 10, conventionally a storage battery, having its negative terminal grounded by a ground lead 12. The power source 10 has a positive or output lead 14 connected to a terminal of an ignition switch 16. When the ignition switch 16 is closed, voltage is supplied to an indicator, identified in its entirety by the numeral 18, via a lead 20. The indicator 18 is of the well-known electric current measuring or ohmmeter type and includes a pair of field coils 22 and 24, a graduated indicator face 26, which is shown in FIG. 2, and a movable indicator element or pointer 28, the position of the pointer 28 relative to the face 26 being responsive to the circuit resistance between an indicator lead 29 and the ground. Fixed resistors 30, 31, 32, and 33 are connected in series to the indicator lead 29, and a variable resistor 34 is interposed between the last fixed resistor 33 and the ground. The fixed resistors are advantageously components of a resistor bridge 36.

Connected to the circuit between the fixed resistors 30 and 31 is a first switch lead 38, which is connected to and grounded by a switch 40 when the switch is closed, thereby bypassing the resistors 31, 32, 33, and 34. The switch 40 is mounted on the internal combustion engine 42 and in the preferred embodiment is a pressure actuated switch, which is responsive to the engine oil pressure and closes when the oil pressure falls below a predetermined pressure. Such pressure switches are well-known and widely used for indicating loss of engine oil pressure, and therefore the switch 40 is schematically illustrated. A second switch lead line 44 is connected to the circuit between the fixed resistors 31 and 32 and is connected to and groundable by a second switch 46, which is also mounted on the engine 42. The switch 46 is responsive to the temperature of the engine coolant and closes when the coolant exceeds a predetermined temperature. Like the pressure actuated switch 40, such temperature actuated switches are widely known and utilized, and it is therefore schematically illustrated. A third lead line 48 is connected to the circuit between the resistors 32 and 33 and is connected to and groundable by the closing of a relay 50, which has one end of its coil connected to the output terminal of the ignition switch 16 by a lead line 52 and the other end of its lead line connected to an alternator 54. The alternator is associated with the engine in the conventional manner for supplying electric energy to the power source 10, the relay 50 closing when there is a lower voltage at the alternator 54 than at the power source 10. The resistance of the variable resistor 34 is proportional to the quantity of fuel in an engine fuel reservoir 56, the resistor 34 being connected to and actuated by a float-type sensing unit 58 of conventional construction, mounted in the fuel reservoir 56.

During operation of the engine, when the oil pressure, coolant temperature, and alternator output are at satisfactory levels, the switches 40 and 46 and the relay 50 are open, so that the indicator measures the total resistance of the resistors 30, 31, 32, 33, and 34. The values of the resistors and the calibration of the indicator 18 is such that the pointer 28 is opposite the "fuel" area of the indicator face. When the switches are open, the greater the measured resistance, the farther the clockwise swing of the pointer 28. When the fuel tank 56 is full, the variable resistor 34 is set for maximum resistance, so that the pointer 28 swings to its extreme clockwise position (to the right in FIG. 2), wherein it points at the letter F in the fuel area of the indicator face 26. As the fuel level decreases, the resistance of the variable resistor 34 decreases, so that when the fuel tank is empty, resistance of the variable resistor is at its minimum value, whereby the pointer shifts in a counterclockwise direction and points at the letter E in the fuel area of the indicator face.

If the alternator voltage drops below the battery voltage, the relay 50 closes, shorting out both the resistors 33 and 34, so that the indicator measures only the sum of the resistors 30, 31, and 32, the decreased resistance causing a counterclockwise shift of the pointer 28 until it points at the area of the indicator face indicated by the abbreviation "ALT.," indicating a malfunction of the alternator. Similarly, if the cooling temperature exceeds the predetermined value or if the oil pressure falls below a predetermined value, the switches 46 or 40 will close, changing the resistance measured by the indicator 18 so that the pointer 28 will shift to that area of the indicator face which identifies the particular malfunction. Since the indicator will indicate only one malfunction at a time, the malfunction switch connected closest to the indicator taking precedence, it is preferable to have the first malfunction switch 40 respond to the most critical engine function, which in the illustrated embodiment is the engine oil pressure.

Figure 3:
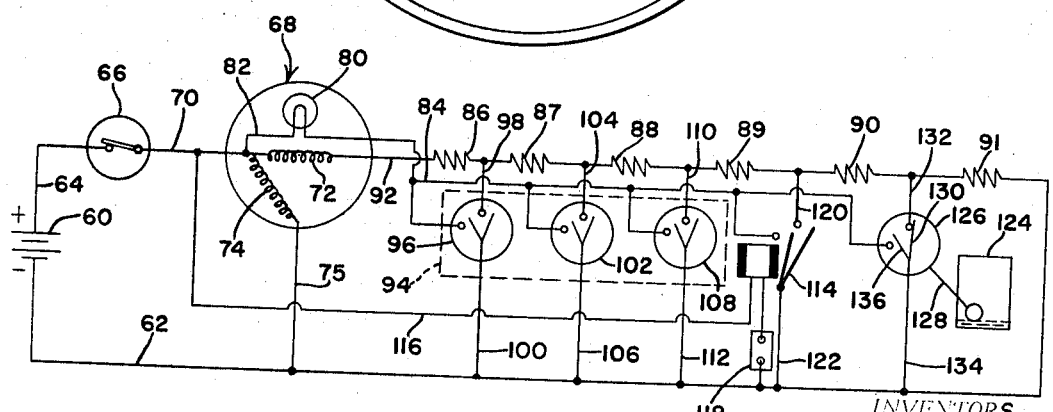
FIG. 3 is a schematic illustration of a second embodiment of the engine monitoring system.
Figure 4:
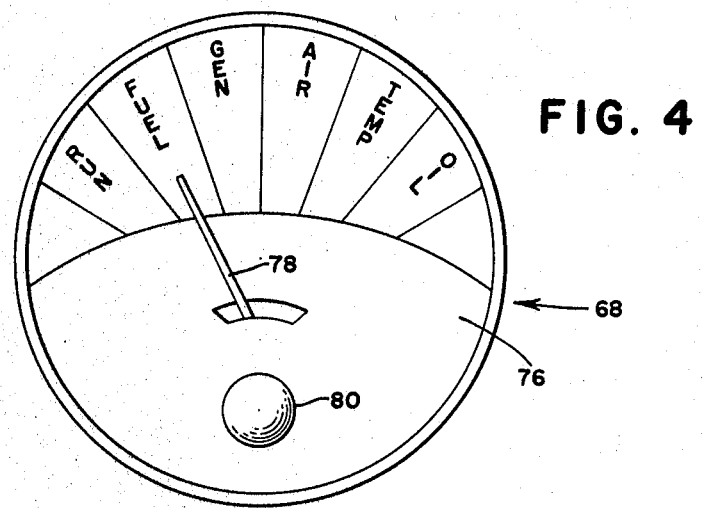
FIG. 4 is a view of the face of the indicator used in the embodiment shown in FIG. 3.

Like the embodiment shown in FIGS. 1 and 2, the embodiment shown in FIGS. 3 and 4 includes a direct current power source or battery 60 having its negative terminal connected to a ground line 62 and its positive terminal connected to an ignition switch 66 by a lead 64, the switch 66 being closed during operation of the engine. An indicator 68 of the current measuring or ohmmeter type has its input terminal connected to the ignition switch 66 by a lead 70, so that a voltage is supplied to the indicator 68 when the ignition switch is closed. The indicator 68 is of conventional construction and includes a pair of field coils 72 and 74, the latter coil being connected to the ground 62 by a lead 75. The indicator 68 again includes a graduated face 76 separated into adjacent labeled areas, and a movable element or pointer 78 shiftable relative to the indicator face into different positions opposite the different labeled face areas in response to current changes in the coils 72 and 74. The indicator also includes an incandescent signal light 80 on the indicator face, connected to the indicator input lead 70 by a lead 82 and connectible to the ground 62 by a lead 84, the light 80 lighting up when the lead 84 is grounded.

A bank of series-connected resistors 86, 87, 88, 89, 90, and 91 are connected in series with the indicator field coil 72, the first resistor 86 being connected to the field coil by a lead 92 and the last resistor 91 being connected to the ground 62.

Mounted in a schematically illustrated internal combustion engine 94 in a pressure actuated switch 96 connected to the circuit between the resistors 86 and 87 by a lead 98 and to the ground 62 by a lead 100, the switch 96, like the above-described switch 40, closing when the engine oil pressure falls below a predetermined value to ground the lead 98 and short the resistors 87, 88, 89, 90, and 91. The switch 96 also completes the signal light circuit when it closes, causing the light 80 to glow. A temperature responsive switch 102 is also mounted in the engine 94 and, like the above-described switch 46, closes when the cooling temperature exceeds a predetermined value, connecting the circuit between the resistors 87 and 88 to the ground 62 via the leads 104 and 106. The switch 102 also completes the signal light circuit when it closes. A third switch 108 is also associated with the engine 94 and, like the switch 96, is a pressure actuated switch of known construction, the switch 108 in the illustrated embodiment being responsive to the vacuum created by the air cleaner restriction, the switch closing when excessive air cleaner restriction causes a vacuum over a predetermined value to connect the circuit between the resistors 88 and 89 to the ground via the leads 110 and 112. The switch 108 also completes the signal light circuit when it closes.

A relay 114 has one end of its coil connected to the lead 70 by a lead 116 and the other end of its coil connected to an engine-driven generator 118 of conventional construction, the relay 114 closing when the battery voltage exceeds the voltage at the generator. When the relay 114 is closed, the circuit is grounded between the resistors 89 and 90 by means of leads 120 and 122, the relay 114 also completing the indicator light circuit.

The engine 94 has an associated fuel tank or reservoir 124 and a mechanically actuated switch 126 is responsive to the fluid level in the tank 124 through a float-type mechanism 128 of conventional construction. The switch 126 has dual contacts which close at different fluid levels in the tank 124, the first contact 130 closing at one predetermined fluid level to ground the circuit between the resistors 90 and 91 via the leads 132 and 134, and the second contact 136 closing at a lower level to ground the lead 84 and complete the indicator light circuit.

When the engine is functioning normally and there is sufficient fuel in the tank 124, all the switches are open so that the resistors 86, 87, 88, 89, 90, and 91 are all included in the circuit, as a result of which the indicator pointer 78 is located opposite the "run" area of the indicator face 76. If the fuel level drops below a predetermined point, approximately six gallons in the preferred embodiment, the contact 130 of the switch 126 will close, bypassing the resistors 91 and causing the pointer 78 to shift opposite the "fuel" area of the indicator face. An additional decrease in the fuel level to a second predetermined quantity, approximately two gallons in the preferred embodiment, causes the contact 136 to close so that the indicator light 80 lights up, indicating to the operator that his fuel supply is critically low. As in the previously described embodiment, an engine malfunction or condition which causes the closing of one of the switches 96, 102, 108, or 114 will subtract certain of the resistors from the circuit so that the pointer 78 will shift opposite the indicator face area which corresponds to the malfunction. The closing of the switches also completes the indicator light circuit, the glowing light 80 attracting the operator's attention to the indicator. As in the previous embodiment, the closing of a switch closer to the indicator will supersede a closed switch farther from the indicator so that the indicator will indicate only the condition or malfunction which corresponds to the closed switch closest to the indicator. Again, it is desirable that the functions be connected to the indicator circuit in decreasing order of importance in regards to their potential damage to the engine.

Figure 5:
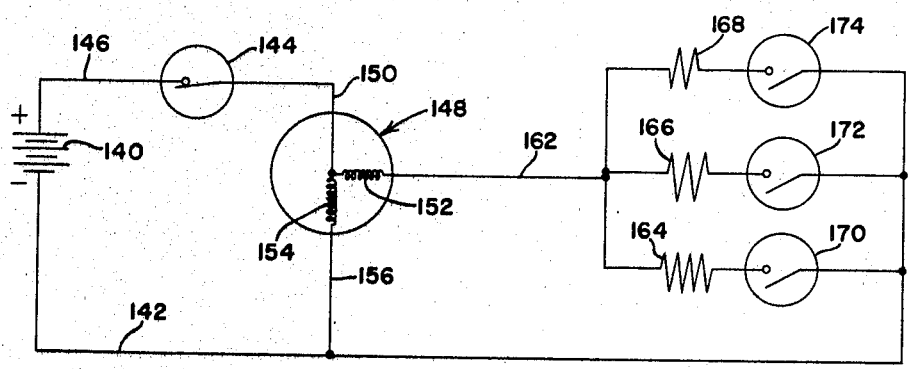
FIG. 5 is a schematic illustration of a third embodiment of the invention.
Figure 6:
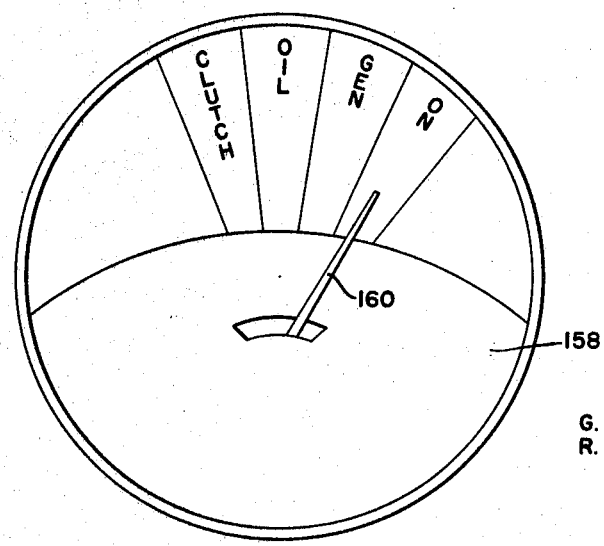
FIG. 6 is a view of the face of the indicator utilized in the embodiment shown in FIG. 5.

The third embodiment of the monitoring system illustrated in FIGS. 5 and 6 includes a direct current power source or battery 140 having its negative terminal connected to a ground 142 and its positive terminal connected to an ignition switch 144 by a lead 146, the ignition switch again being of conventional construction and closed during operation of the engine. A current measuring or ohmmeter type indicator 148 is connected to the ignition switch 144 by a lead wire 150 and again includes a pair of field coils 152 and 154, the coil 154 being grounded by the lead 156. The indicator 148 also includes an indicator face 158, part of which is separated into labeled areas, and a movable indicator element or pointer 160 which is positioned opposite the various labeled indicator face areas in response to the current in the coils 152 and 154.

The field coil 152 is connected to three parallel resistors 164, 166, and 168 having different values by a lead 162. The first resistor 164 is connected to and groundable by a pressure actuated switch 170, the switch in the illustrated embodiment being of conventional design and responsive to the clutch oil pressure so that the resistor 164 is connected to the ground 142 when the clutch oil pressure falls below a predetermined value. The resistor 166, which has a smaller resistance value than the resistor 164, is connected to and groundable by a second pressure actuated switch 172, the switch 172 also being of conventional construction, and, in the illustrated embodiment, being responsive to the engine oil pressure so that it connects the resistor 166 to the ground 142 when the oil pressure falls below a predetermined value. The resistor 168, which has a smaller resistance value than the resistor 166, is connected to and groundable by a third switch or relay 174, the relay 174 being similar to the above-described relay 114 and closing when the generator voltage falls below the battery voltage to ground the resistor 168.

In operation, when the ignition switch is on and the engine is not running, the three functions which control the switches 170, 172, and 174 are below their critical points since the oil pumps and generator are driven by the engine, so that the switches 170, 172, and 174 are closed, whereby the indicator will read the resultant of the three parallel connected resistors 164, 166, and 168. For example, if the resistor 164 is 240 ohms, the resistor 166 is 180 ohms, and the resistor 168 is 120 ohms, the calculated total resistance of the resistors connected in parallel is approximately 56 ohms and the indicator will indicate this value, the pointer 160 being opposite the "on" area of the indicator face which corresponds to this resistance value. With the engine running, and the various functions operating satisfactorily, the switches 170, 172, and 174 open so that the indicator will measure an open circuit resistance and will not point to any of the labeled areas of the indicator face. A single malfunction will cause the closing of the switch which is actuated by that particular function and the indicator pointer 160 will point to the face area which corresponds to the particular malfunction. For example, if the engine oil pressure falls below a predetermined value, the switch 172 will close so that the indicator will measure the resistance of the resistor 166, which is 180 ohms in the above-described example, the area labeled "oil" on the indicator face corresponding to 180 ohms. Of course, if two malfunctions occur at the same time, the indicator will measure the sum of the two resistances connected in parallel and the pointer 160 will point to neither malfunction. Since this particular embodiment of the system is unable to cope with more than one malfunction, it is preferable that the system monitor only malfunctions which will be corrected immediately.

It is to be understood that the invention is not limited to the particular malfunctions illustrated, however. Moreover, other features and advantages of the invention will readily occur to those skilled in the art, as will many modifications and alterations in the preferred embodiments described herein, all of which may be achieved without departing from the spirit and the scope of the invention.

What is claimed is:

1. In an internal combustion engine having an associated fuel supply system with a variable fuel supply, a pressurized lubricating system with a variable output pressure, an electric power generating system adapted to generate variable amounts of electric power, and a cooling system operative at variable temperatures, the improvement comprising: an electric circuit including a source of direct current; an indicator operatively connected in said circuit and including a graduated indicator face and a movable indicator element adapted to move into different positions relative to and adjacent to the indicator face in response to variations in the current in said circuit; a plurality of fixed resistors includable in the circuit; an electric condition responsive switch associated with each resistor and actuatable to switch the respective resistor into and out of the circuit to vary the current therein; and means connecting each switch to a different one of said systems for actuating the switch when the variable condition of the system passes a predetermined point.

2. The invention defined in claim 1 wherein the indicator includes an electrically actuatable signal light and at least one of said switches is operatively connected to the signal light for supplying electric power thereto when the switch is actuated.

3. The invention defined in claim 1 wherein the resistors are connected in series with the indicator and each switch includes a different number of resistors in the circuit when actuated.

4. The invention defined in claim 1 wherein the resistors have different values and are connected in parallel with each other and in series with the indicator.

5. The invention defined in claim 1 wherein said plurality of resistors includes first, second, and third resistors conectible in series with the indicator and first, second, and third switches are respectively associated with said resistors, the first switch being actuatable in response to one of said systems to bypass said three resistors, the second switch being actuatable in response to a second of said systems to bypass two of said resistors, and the third switch being actuatable in response to a third of said systems to bypass only one of said three resistors.

6. The invention defined in claim 5 and including a variable resistor connectible in series with said resistors and includable in the circuit only when said first, second, and third resistors are included in the circuit, and also including means for varying the resistance of the variable resistor according to the quantity of fuel in the fuel supply system.

7. The invention defined in claim 5 wherein said first switch is responsive to the pressure in the lubricating system and is actuated when the engine oil pressure goes below a predetermined pressure.

8. The invention defined in claim 7 wherein the second switch is responsive to the temperature in the cooling system and is actuated when the engine temperature exceeds a predetermined temperature.

9. The invention defined in claim 8 wherein the indicator includes an electrically actuatable signal light operatively connected to said switches for actuation when a switch is actuated.

References Cited

UNITED STATES PATENTS 2,571,360 10/1951 Hallerberg _____ 340—52
2,957,160 10/1960 Taganyi et al. _____ 340—52

FOREIGN PATENTS 590,498 1/1960 Canada.

LOUIS R. PRINCE, *Primary Examiner.*

DONALD O. WOODIEL, *Assistant Examiner.*

U.S. Cl. X.R.

73—292; 340—52